(12) United States Patent
Shtin

(10) Patent No.: US 7,809,055 B2
(45) Date of Patent: Oct. 5, 2010

(54) RECURSIVE EQUALIZATION MATRIX FOR MULTIPLE INPUT MULTIPLE OUTPUT SYSTEMS

(75) Inventor: Sergey Shtin, N. Novgorod (RU)

(73) Assignee: Intel Corporation, Santa Clara, CA (US)

( * ) Notice: Subject to any disclaimer, the term of this patent is extended or adjusted under 35 U.S.C. 154(b) by 856 days.

(21) Appl. No.: 11/711,986

(22) Filed: Feb. 28, 2007

(65) Prior Publication Data

US 2008/0205259 A1 Aug. 28, 2008

(51) Int. Cl.
*H03H 7/30* (2006.01)
*H03H 7/40* (2006.01)
*H03K 5/159* (2006.01)

(52) U.S. Cl. .................. 375/232; 375/260; 375/316

(58) Field of Classification Search ......... 375/229–233, 375/259–260, 267
See application file for complete search history.

(56) References Cited

U.S. PATENT DOCUMENTS

| 5,852,630 | A * | 12/1998 | Langberg et al. ............ 375/219 |
| 7,616,695 | B1 * | 11/2009 | Sarrigeorgidis ............. 375/260 |
| 2007/0002985 | A1 * | 1/2007 | Kimata et al. ............... 375/350 |
| 2007/0147538 | A1 * | 6/2007 | Jung et al. .................. 375/267 |
| 2008/0317141 | A1 * | 12/2008 | Burg et al. .................. 375/260 |

* cited by examiner

*Primary Examiner*—Chieh M Fan
*Assistant Examiner*—James M Perez
(74) *Attorney, Agent, or Firm*—Lee & Hayes, PLLC

(57) ABSTRACT

A method for receiving a signal in a wireless communication system based on Multiple-Input Multiple Output (MIMO)—Orthogonal Frequency Division Multiplexing (OFDM) through multiple antennas. In the system, weight for a zero forcing based equalization matrix is determined by inverting a channel transfer matrix for each subcarrier of the signals. The original data transmitted is recovered by combining data subcarriers from different receive antennas using the calculated weights thus reducing the system complexity.

4 Claims, 4 Drawing Sheets

RECURSIVE EQUALIZATION MATRIX FOR MULTIPLE INPUT MULTIPLE OUTPUT SYSTEMS

BACKGROUND

The claimed embodiment relates to a wireless communication system, and more particularly to detecting and decoding a signal in an Orthogonal Frequency Division Multiplexing (OFDM) Multiple Input Multiple Output (MIMO) communication system.

A MIMO communication system transmits and receives data using multiple transmit antennas and multiple receive antennas. A MIMO channel, formed by transmit and receive antennas, is divided into a plurality of independent spatial subchannels. Because the MIMO system employs multiple antennas, it outperforms a single antenna system by having greater channel capacity.

Multiple antenna techniques also allow spatial multiplexing of data streams originating from one or multiple users. MIMO detection schemes used in the latest recommendations from standards organization use equalizers having weight matrices for every subcarrier and multiplication of the OFDM subcarrier received signals from different antennas to get estimates of the transmitted data symbols. The performance and complexity of such systems will depend on the number of antennas used. As more antennas are used, the greater the complexity of the system. Greater complexity may typically require additional computational blocks.

DESCRIPTION OF THE FIGURES

Additional objects and features as defined by the claims will be more readily apparent from the following detailed description and appended claims when taken in conjunction with the drawings, in which:

DESCRIPTION

Figure 1:
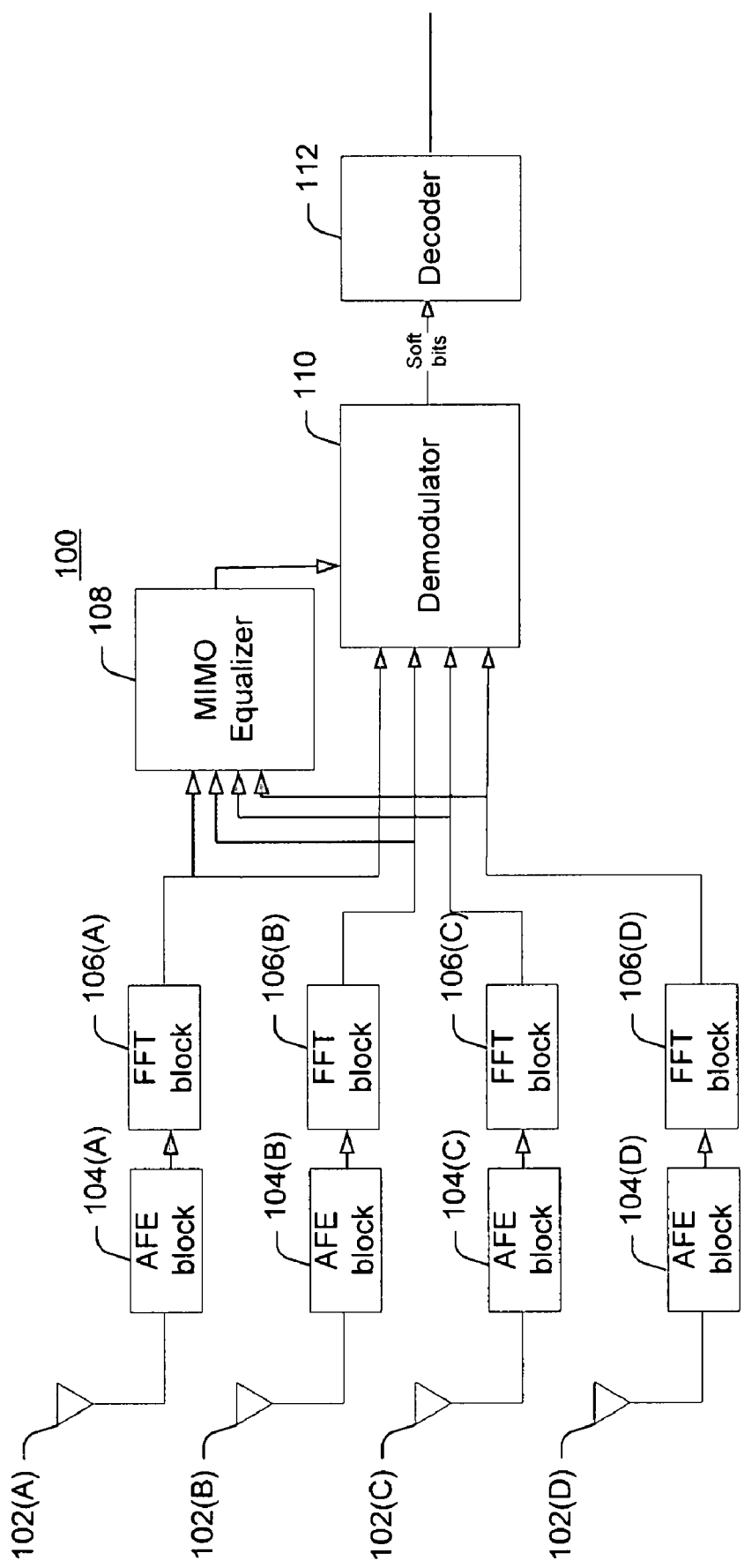
FIG. 1 depicts a simplified block diagram of a receiver of the OFDM system to which a signal detection and decoding system of the claimed embodiment is applied.

FIG. 1 depicts a structure of a receiver 100 of a MIMO OFDM system to which signal detection and decoding is applied. In FIG. 1, receiver 100 includes a plurality of antennas 102 (A-D) respectively coupled via Analog Front-End (AFE) 104(A-D) and Fast Fourier Transform (FFT) blocks 106 (A-D) to an input of MIMO equalizer circuit 108 and demodulator circuit 110. MIMO equalizer circuit 108 has an output coupled to demodulator circuit 110. The output of demodulation circuit 110 is coupled to decoder circuit 112 which generates data bits for a computer or any processing device (not shown) for further handling.

During operation packetized analog signals from antennas are transformed to a baseband signal on AFE (Analog Front-End) blocks 102 (A-D). The resulting baseband signal is transformed into different sub-carriers as a frequency domain representation using FFT blocks 106 (A-D) and is fed to MIMO equalizer 108 and to Demodulator block 110. Equalizer 108 performs an estimation of channel coefficients (out of scope), forms an equalization matrix and sends matrix information to demodulator 110 which equalizes the transformed signal using an equalization matrix. In one embodiment the equalization matrix may be sent during the reception of a special block in the received packet. Using this block it may be possible to perform an estimation/calculation of channel coefficients (e.g. channel matrix H). In another embodiment the equalization matrix may be a zero forcing based equalization matrix. The equalization matrix may be determined by determining a weight by inverting at least one channel transfer matrix for each subcarrier of the signals. Data may be recovered by combining data subcarriers from different receive antennas using the determined weights. Further details of the equalization matrix are described in FIGS. 3 and 4.

The output of the equalization matrix 108 is feed to the demodulator 110 which restores the original modulated signals and transforms them into a series of soft bits that are transferred to decoder 112. Decoder 112 parses and decodes the soft bits to obtain the original transmitted data from the symbols. The output of decoder 112 may then be transmitted to a computer device (not shown) for further processing.

Figure 2:
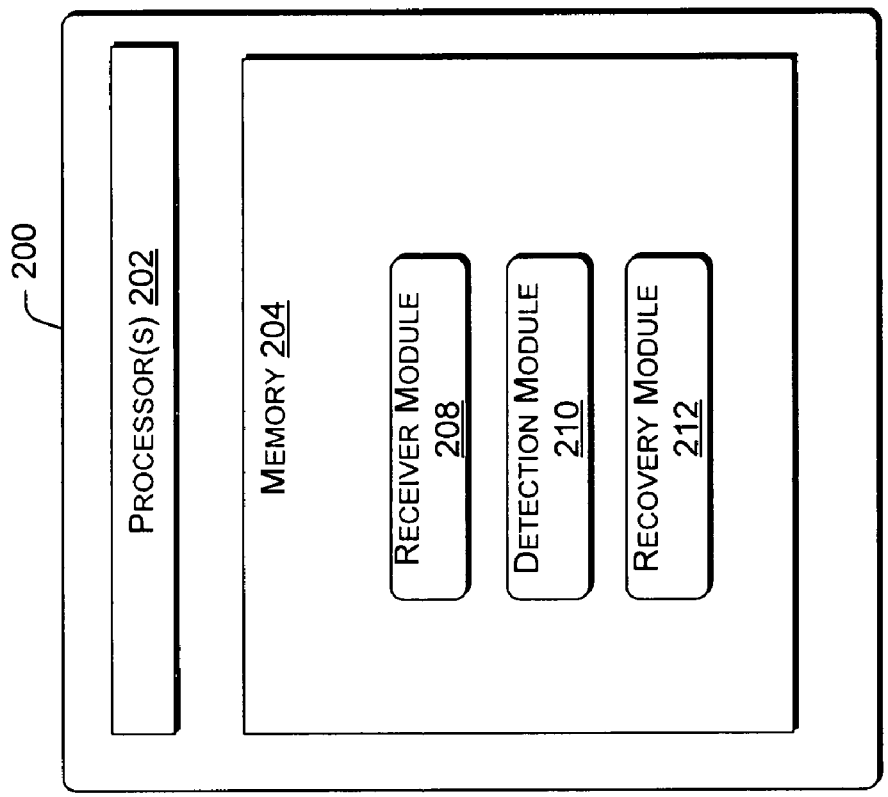
FIG. 2 is a component diagram of the equalizer used in the detection and decoding an OFDM MIMO system.

FIG. 2 further depicts an embodiment of an illustrative implementation of certain components of FFT blocks 106, in which MIMO equalization circuit 200 may be used to equalize the transformed signal with demodulator circuit 110 and decoder circuit 112. The equalization circuit 200 may have process capabilities and memory suitable to store and execute computer-executable instructions. In this embodiment, the equalization circuit 200 includes one or more processors 202 and memory 204. The memory 204 may include volatile and nonvolatile memory, removable and non-removable media implemented in any method or technology for storage of information, such as computer-readable instructions, data structures, program modules or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computer system.

Stored in memory 204 are modules 208-212. Modules 208-212 are implemented as software or computer-executable instructions that are executed by one or more processors 202. Receiver module 208 receives the signal from antennas 102 and generates an FFT transformed signal.

Detection module 210 detects one or more symbols from the received signal using an equalization matrix. The detection module 210 may determine the equalization matrix by inverting at least one channel transfer matrix for each subcarrier of the signals. At least one channel transfer matrix may be an N×N Matrix H. Matrix H may be defined by the following equation (1):

$$H = \begin{pmatrix} A & B \\ C & D \end{pmatrix}, A \in H^{K \times K}, B \in H^{K \times M}, \qquad (1)$$

$$C \in H^{M \times K}, D \in H^{M \times M} m, K + M = N$$

Matrix H may be inverted by multiplying $S_1 \times S_2 \times S_3$. $S_1$–$S_3$ may be defined by the following equations (2)-(4) respectively:

$$S_1 = \begin{pmatrix} I & 0 \\ X & \alpha I \end{pmatrix},$$

$$X \in C^{MXK}$$

(2)

$$S_2 = \begin{pmatrix} \beta I & Y \\ 0 & I \end{pmatrix},$$

$$Y \in C^{KXM}$$

(3)

$$S_3 = \begin{pmatrix} adj(A) & 0 \\ 0 & adj(E) \end{pmatrix}$$

(4)

For equations (2)-(4), I is an identity Matrix, 0 is a zero Matrix, and $X=-Cadj(A)$, $E=\alpha D+XB$, $Y=-Badj(E)$. The term "adj" determines an adjoint matrix, which may be calculated via the algebraic cofactors of matrix H. A Matrix $V=S_1S_2S_3$ inverts Matrix H. Two scaling gains may need to be computed for the output of equalization matrix by using equation (5), where "det" is a determinate function, to avoid a division operation in demodulator block 110.

$$\alpha = det(A), \beta = det(E)$$ (5)

Recovery module 212 may recover the original data transmitted using the symbols and by combining data subcarriers from different receive antennas using weights calculated with the equalization matrix. The weights for each subcarrier may be calculated with the recovery module 212 by inverting the channel transfer matrix for each subcarrier.

Figure 3:
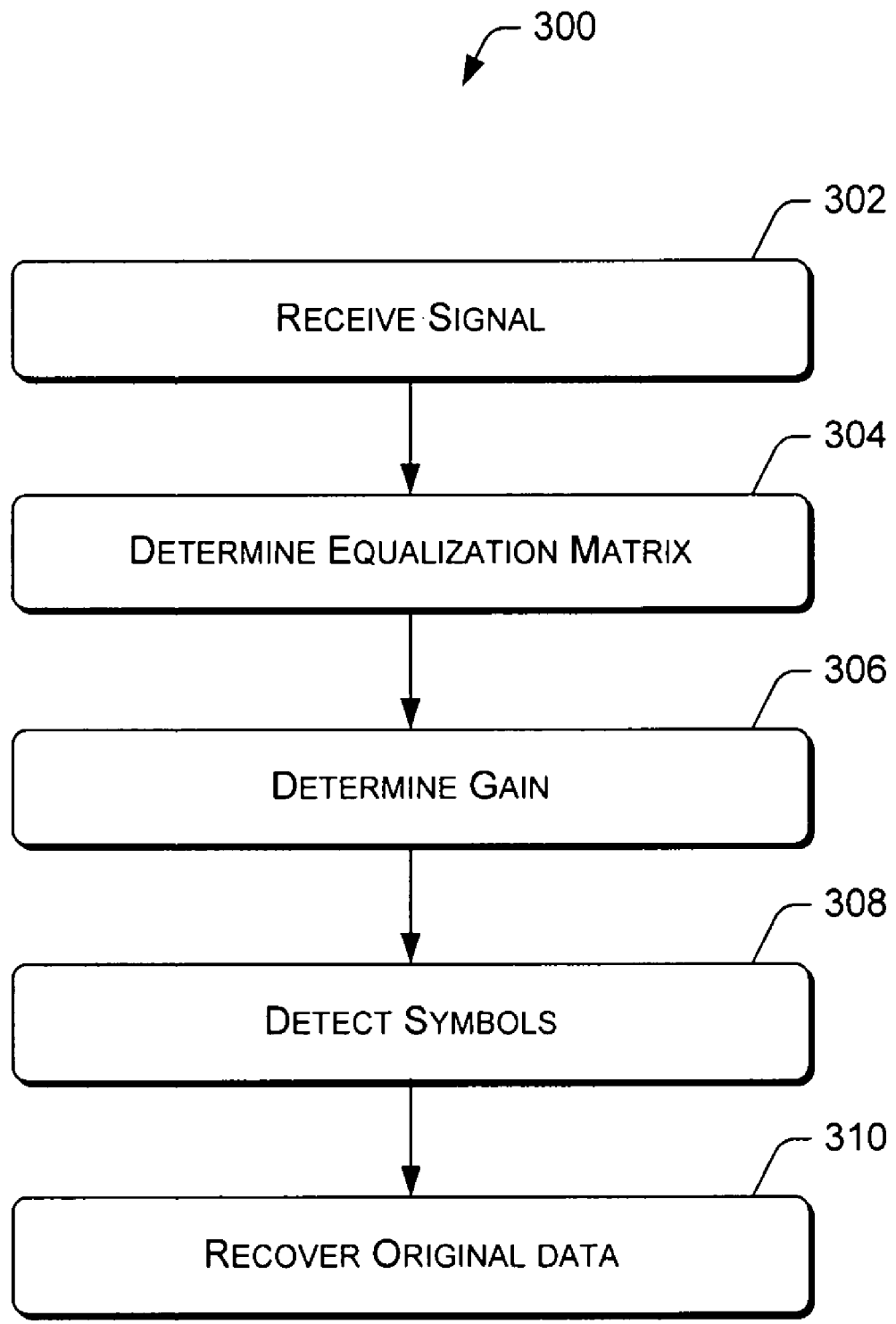
FIG. 3 is a flow diagram of the method for detecting and decoding signals in an OFDM MIMO system.

FIG. 3 depicts a process for the detecting and decoding signals in an OFDM MIMO system using an equalization matrix. The process is depicted as a collection of blocks in a logical flow diagram, which represents a sequence of operations that can be implemented in hardware, software, and a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the process is described with reference to the system 100 of FIG. 1, although it may be implemented in other system architectures.

In process 300 a signal is received from the antennas 102 using receiver module 508 in block 302. Receiver module 508 receives the signal from antennas 102 and generates an FFT transformed signal. In block 304 an equalization matrix is determined using detection module 210. A gain is also determined from the channel matrix of received signal in block 306. Further details of determining the equalization matrix and determining gain are described in FIG. 4. In block 308, the symbols are detected from the FFT transformed signal and the determined equalization matrix and gain using detection module 210. The original data is recovered from the symbols with recovery module 212 in block 310.

Figure 4:
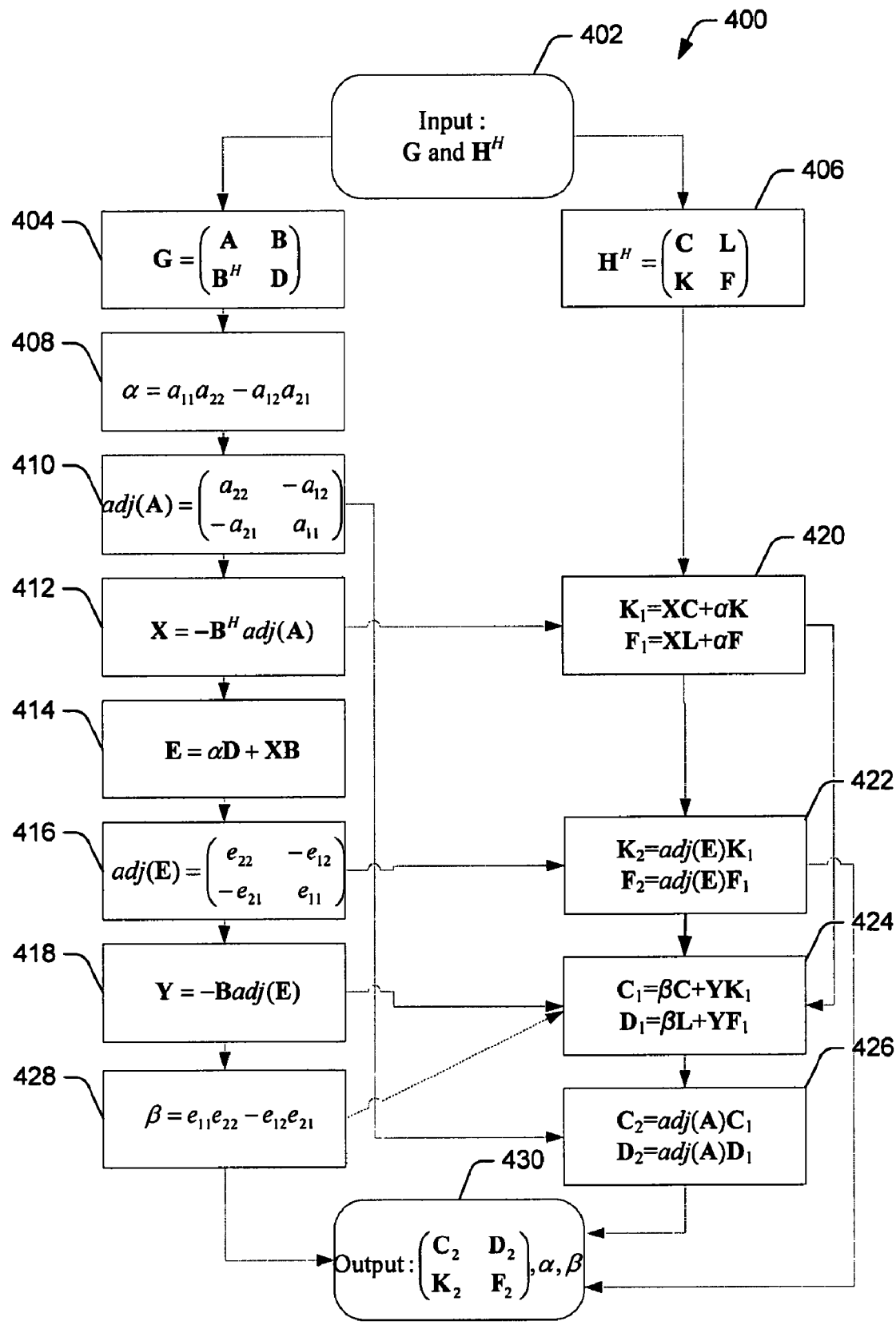
FIG. 4 is an algorithm used by the equalizer in the detection and decoding system.

FIG. 4 depicts an illustrative algorithm 400 for determining an output matrix $$\begin{pmatrix} C_2 & D_2 \\ K_2 & F_2 \end{pmatrix}$$

shown in block 430 with gains of $\alpha$, and $\beta$ using exemplary channel transfer matrix $H^H$. A Hermitian matrix G may be formed from H by the following: $G=H^HH$ or $G=H^HH+N$ where N is a noise covariance matrix calculated during the channel estimation time interval (block 402) provided to detection module 210. Gains $\alpha$, and $\beta$ may be required for scaling of constellation points fed to the demodulator 110. These gains may be required for scaling of constellation points on the demodulator side if the processing device does not have dividing unit. In this exemplary embodiment, matrix G is assigned matrix $$G = \begin{pmatrix} A & B \\ B^H & D \end{pmatrix}$$

in block 404 and channel transfer matrix $H^H$ is assigned matrix $$H^H = \begin{pmatrix} C & L \\ K & F \end{pmatrix}$$

in block 406. In block 408, alpha (A) is assigned using equation (6).

$$\alpha = a_{11}a_{22} - a_{12}a_{21}$$ (6)

The congregate of A, X, E, the congregate of E and Y are determined by equations (7)-(11) in blocks 410-418 respectively.

$$adj(A) = \begin{pmatrix} a_{22} & -a_{12} \\ -a_{21} & a_{11} \end{pmatrix}$$ (7)

$$X = -B^H adj(A)$$ (8)

$$E = \alpha D + XB$$ (9)

$$adj(E) = \begin{pmatrix} e_{22} & -e_{12} \\ -e_{21} & e_{11} \end{pmatrix}$$ (10)

$$Y = -Badj(E)$$ (11)

From equation (8) and $H^H$, $K_1$ and $F_1$ are determined in equation (12) in block 420 as follows:

$$K_1 = XC + \alpha K$$ (12)

$$F_1 = XL + \alpha F$$

Using equation 12 and equation 10, $K_2$ and $F_2$ are determined in equations (13) in block 422.

$$K_2 = adj(E)K_1$$ (13)

$$F_2 = adj(E)F_1$$

$C_1$ and $D_1$ are derived from equations (11) and (13) using equations (14) in block 424, and $C_2$ and $D_2$ are derived from equations (7) and (14) using equations 15 in block 426.

$C_1 = \beta C + YK_1$ (14)

$D_1 = \beta L + YF_1$ $C_2 = adj(A)C_1$ (15)

$D_2 = adj(A)D_1$

β or the gain of the equalization matrix is determined by equation (16) in block 428 to complete the matrices for the output $$\begin{pmatrix} C_2 & D_2 \\ K_2 & F_2 \end{pmatrix}$$

depicted in block 430.

$\beta = e_{11}e_{22} - e_{12}e_{21}$ (16)

In closing, although the invention has been described in language specific to structural features and/or methodological acts, it is to be understood that the invention defined in the appended claims is not necessarily limited to the specific features or acts described. Rather, the specific features and acts are disclosed as illustrative forms of implementing the claimed invention.

The invention claimed is:

1. A method comprising:
receiving a signal in a wireless communication system based on Multiple-Input Multiple Output (MIMO)—Orthogonal Frequency Division Multiplexing (OFDM) through multiple receive antennas;
detecting one or more symbols from the received signal using an equalization matrix, said equalization matrix being determined by inverting at least one channel transfer matrix for each subcarrier of the signal;
recovering original data transmitted from the detected one or more symbols, wherein the original data is recovered by combining data subcarriers from different receive antennas using weights calculated with said equalization matrix, and wherein the weights for each subcarrier are calculated by inverting the channel transfer matrix for each subcarrier; and
determining a Matrix V, wherein the at least one channel transfer matrix is N×N Matrix H, wherein Matrix $V=S_1 S_2 S_3$ and inverts Matrix H, wherein Matrix $$\begin{pmatrix} A & B \\ B^H & D \end{pmatrix},$$

$A \in H^{K \times K}$, $B \in H^{K \times M}$, $C \in H^{M \times K}$, $D \in H^{M \times M}$, $K+M=N$, wherein $$S_1 = \begin{pmatrix} I & 0 \\ X & \alpha I \end{pmatrix}, X \in C^{M \times K}, \text{ and } S_2 = \begin{pmatrix} \beta I & Y \\ 0 & I \end{pmatrix}, Y \in C^{K \times M},$$

and $$S_3 = \begin{pmatrix} adj(A) & 0 \\ 0 & adj(E) \end{pmatrix},$$

I is an identity Matrix, 0 is a zero Matrix, wherein X=−Cadj(A), E=αD+XB, Y=−Badj(E), α=det(A), and β=det(E).

2. An apparatus comprising:
a receiver circuit to receive from multiple receive antennas a signal in a wireless communication system based on Multiple-Input Multiple Output (MIMO)—Orthogonal Frequency Division Multiplexing (OFDM); and
a detector circuit to detect one or more symbols from the received signal using a equalization matrix, said equalization matrix being determined by inverting at least one channel transfer matrix for each subcarrier of the signal, and to recover original data transmitted from the detected one or more symbols, wherein the original data is recovered by combining data subcarriers from different receive antennas using weights calculated with said equalization matrix, and wherein the weights for each subcarrier are calculated by inverting the channel transfer matrix for each subcarrier
wherein the detector circuit further comprises an equalization circuit to determine an equalization matrix V, wherein the channel transfer matrix is N×N Matrix H, wherein Matrix $V=S_1 S_2 S_3$ and inverts Matrix H, wherein Matrix H=

$$\begin{pmatrix} A & B \\ C & D \end{pmatrix},$$

$A \in H^{K \times K}$, $B \in H^{K \times M}$, $C \in H^{M \times K}$, $D \in H^{M \times M}$, $K+M=N$, wherein $$S_1 = \begin{pmatrix} I & 0 \\ X & \alpha I \end{pmatrix},$$

$X \in C^{M \times K}$, and $$S_2 = \begin{pmatrix} \beta I & Y \\ 0 & I \end{pmatrix},$$

$Y \in C^{K \times M}$, and $$S_3 = \begin{pmatrix} adj(A) & 0 \\ 0 & adj(E) \end{pmatrix},$$

I is an identity Matrix, 0 is a zero Matrix, wherein X=−Cadj(A), E=αD+XB, Y=−Badj(E), α=det(A), and β=det(E).

3. A system comprising:
one or more antennas to receive multiple Orthogonal Frequency Division Multiplexing (OFDM) signals based on Multiple Input Multiple out (OFDM);
a receiver to receive the signals from the antennas;
an equalizer generating an equalizing matrix determined by inverting at least one channel transfer matrix for each subcarrier of the signals; and
a demodulator and decoder circuit to detect one or more symbols from the received signal using the equalization matrix to recover original data transmitted in the OFDM signals, wherein the original data is recovered by combining data subcarriers from different receive antennas using weights calculated with said equalization matrix, and wherein the weights for each subcarrier are calculated by inverting the channel transfer matrix for each subcarrier, wherein the channel transfer matrix is matrix H, wherein Matrix $V=S_1 S_2 S_3$ and inverts Matrix H, wherein Matrix $$H = \begin{pmatrix} A & B \\ C & D \end{pmatrix},$$

$A \in H^{K \times K}$, $B \in H^{K \times M}$, $C \in H^{M \times M}$, $D \in H^{M \times M}$, $K+M=N$, wherein $$S_1 = \begin{pmatrix} I & 0 \\ X & \alpha I \end{pmatrix},$$

$X \in C^{M \times K}$, and $$S_2 = \begin{pmatrix} \beta I & Y \\ 0 & I \end{pmatrix},$$

$Y \in C^{K \times M}$, and $$S_3 = \begin{pmatrix} adj(A) & 0 \\ 0 & adj(E) \end{pmatrix},$$

I is an identity Matrix, 0 is a zero Matrix, wherein X=−Cadj(A), E=αD+XB, Y=−Badj(E), α=det(A), and β=det(E).

4. A non-transitory computer readable medium comprising:

computer executable instructions which, when executed by a processor, causes the processor to:

receive the Orthogonal Frequency Division Multiplexing (OFDM) signal based on Multiple Input Multiple out (OFDM) from multiple receive antennas;

detect one or more symbols from the received signal using a zero forcing based equalization matrix, said equalization matrix being determined by inverting at least one channel transfer matrix for each subcarrier of the signal;

recover original data transmitted from the detected one or more symbols, wherein the original data is recovered by combining data subcarriers from different receive antennas using weights calculated with said equalization matrix, and wherein the weights for each subcarrier are calculated by inverting the channel transfer matrix for each subcarrier; and determine a Matrix V, wherein the channel transfer matrix is Matrix H, wherein Matrix $V=S_1 S_2 S_3$ and inverts Matrix H, wherein Matrix H=

$$\begin{pmatrix} A & B \\ C & D \end{pmatrix},$$

$A \in H^{K \times K}$, $B \in H^{K \times M}$, $C \in H^{M \times M}$, $D \in H^{M \times M}$, $K+M=N$, wherein $$S_1 = \begin{pmatrix} I & 0 \\ X & \alpha I \end{pmatrix},$$

$X \in C^{M \times K}$, and $$S_2 = \begin{pmatrix} \beta I & Y \\ 0 & I \end{pmatrix},$$

$Y \in C^{K \times M}$, and $$S_3 = \begin{pmatrix} adj(A) & 0 \\ 0 & adj(E) \end{pmatrix},$$

I is an identity Matrix, 0 is a zero Matrix, wherein X=−Cadj(A), E=αD+XB, Y=−Badj(E), α=det(A), and β=det(E).

* * * * *